(No Model.) 2 Sheets—Sheet 2.
D. HUNT.
WHEEL.
No. 576,579. Patented Feb. 9, 1897.
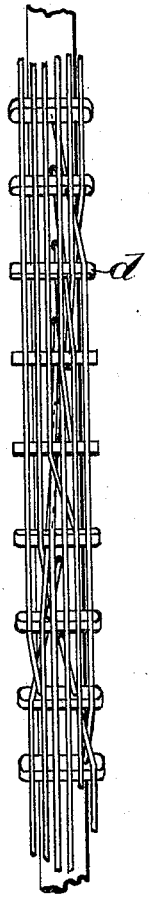
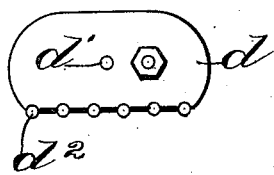
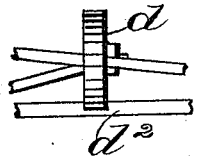
WITNESSES
Charles B Crocker.
F. H. Davis
INVENTOR
David Hunt
by B. J. Hayes
Atty.

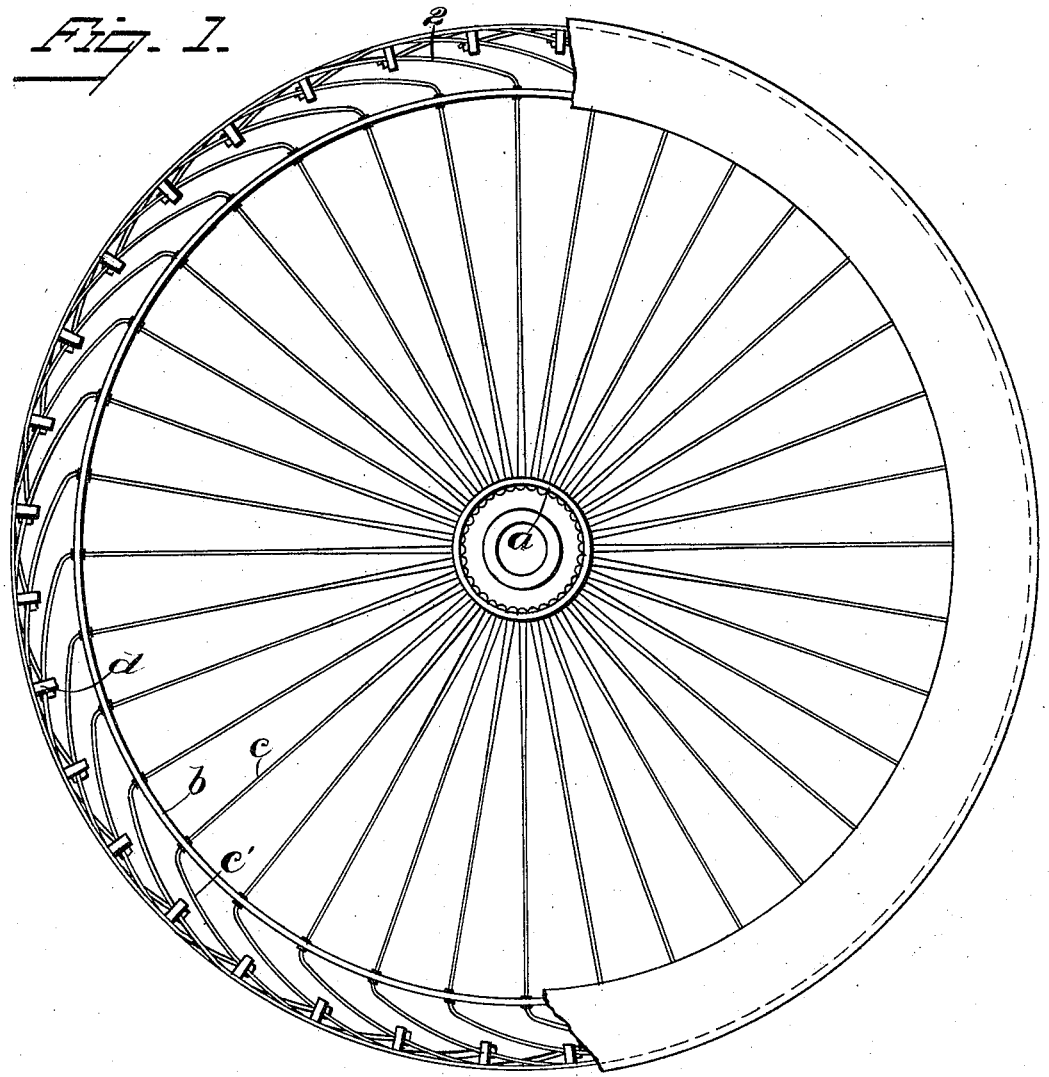

UNITED STATES PATENT OFFICE.

DAVID HUNT, OF BOSTON, MASSACHUSETTS.

WHEEL.

SPECIFICATION forming part of Letters Patent No. 576,579, dated February 9, 1897.

Application filed July 24, 1895. Serial No. 557,014. (No model.)

*To all whom it may concern:*

Be it known that I, DAVID HUNT, of Boston, county of Suffolk, State of Massachusetts, have invented an Improvement in Wheels, of which the following description, in connection with the accompanying drawings, is a specification, like letters and figures on the drawings representing like parts.

This invention relates to that type of wheels having an elastic or spring rim or felly, and has for its object to improve the construction of the same in many particulars.

In accordance with this invention the wheel consists of a hub of any desirable construction, and a rim made either of wood or metal and forming a part of the felly and provided with perforations at regular intervals, and wire spokes extending from said hub radially, passing through the holes in said rim, and then immediately turning substantially tangential to the rim, and continuing thus tangentially a short distance to form springs, the ends of the spring portions of the wires being secured together to form the outer or tread face of the felly, or they may be otherwise secured, the essential feature of the invention being in forming the felly of a rim and a tread-face yieldingly connected together by tangential wires. The entire felly may, if desired, be covered with a rubber or other tire.

Figure 1 shows in side elevation a wheel embodying this invention; Fig. 2, a front view of a portion of the wheel; Fig. 3, a cross-section of the same, taken on the dotted line $xx$; Fig. 4, a side elevation of one of the blocks which I may employ to support the wires and secure the ends thereof.

The hub $a$ is of any usual or suitable construction, and the rim $b$ likewise of any suitable construction, it being perforated, however, at regular intervals.

The spokes $c$ are made of pieces of wires, swaged, if desired, and extending radially from the hub $a$ toward and through the holes in the rim $b$, and, as herein shown, immediately beyond or outside of said rim said wires are turned or bent substantially tangential to the rim and continued for a short distance in such substantially tangential direction to form springs $c'$.

One way of securing the ends of the spring portions of the wires is herein represented, they being continued concentrically to the rim $b$ for any desired distance, as, for instance, one-quarter the circumference of the wheel, and in such case supporting-blocks $d$ may be provided, having central holes $d'$ and grooves $d^2$, through which the wires pass, and the projecting end is screw-threaded and receives upon it a suitable nut for adjustment. For illustration, the tangential wire (marked 2) may first pass through the central hole in the first block, then enter the grooves in the next several successive blocks, and finally pass up through another hole in one of the blocks, and its projecting end may be screw-threaded and supplied with the retaining and tightening nut.

I desire it to be understood that so far as the essential feature of my invention is concerned I may employ any other means for securing the ends of the tangential portions of the wires, and I may terminate the wires at the outer ends of the tangential portions instead of carrying them along, and thereby forming a tread or outer face for the felly, and I may carry them along as a tread or outer face and attach the wire ends of the tangential portions to different points of the rim $b$.

The entire or outer part only of the felly may be covered, as, for instance, with rubber $e$.

I claim—

1. A wheel, consisting of a hub, a perforated rim, wire spokes extending radially from said hub to and through said rim, and outside thereof bent substantially tangential to the rim and extending a short distance to form springs, and then continuing concentrically to said rim, and held in position by suitable fastenings such as the blocks $d$, substantially as described.

2. A wheel, consisting of a hub, a perforated rim, wire spokes extending radially from said hub to and through said rim and outside thereof bent substantially tangential to the rim and extending a short distance to form springs, and then continuing concentrically to said rim, and held in position by suitable fastenings such as the blocks $d$, the end of each wire being screw-threaded beyond one of the blocks and provided with a nut, substantially as described.

3. A wheel, consisting of a hub, spokes and felly, the latter comprising a rim, wires projecting tangentially therefrom, for a short distance, and then continuing concentrically thereto and passing over and under one another to form an outer face, substantially as described.

In testimony whereof I have signed my name to this specification in the presence of two subscribing witnesses.

DAVID HUNT.

Witnesses:
B. J. NOYES,
F. H. DAVIS.